United States Patent Office 3,435,335
Patented Mar. 25, 1969

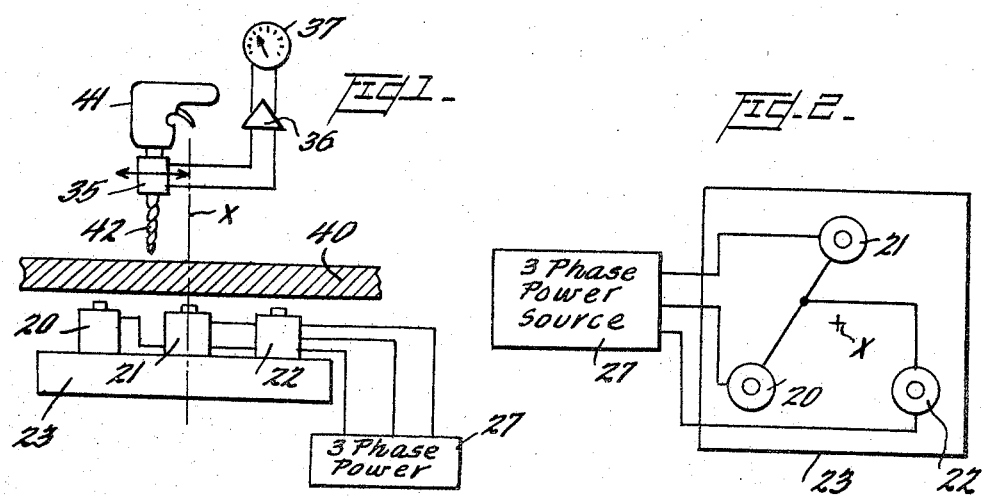
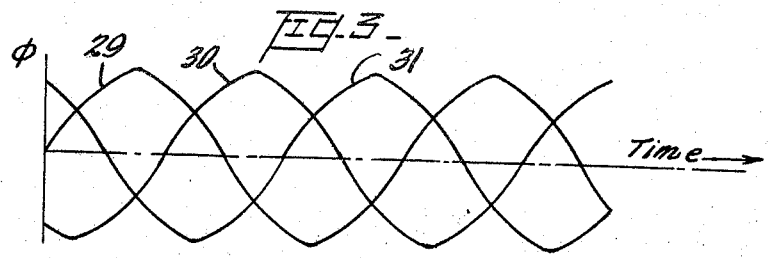
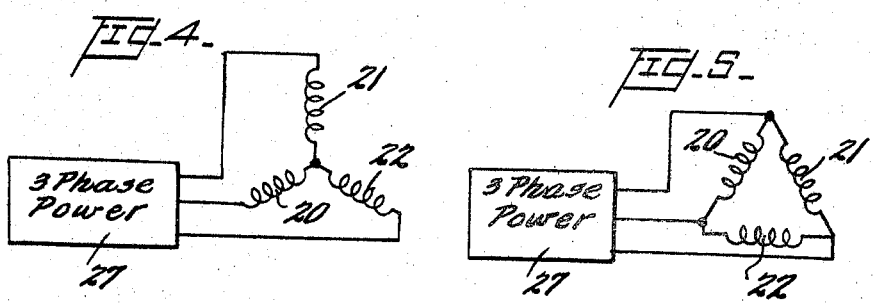
INVENTOR
Frank H. Blitchington, Jr.,
BY
ATTORNEY

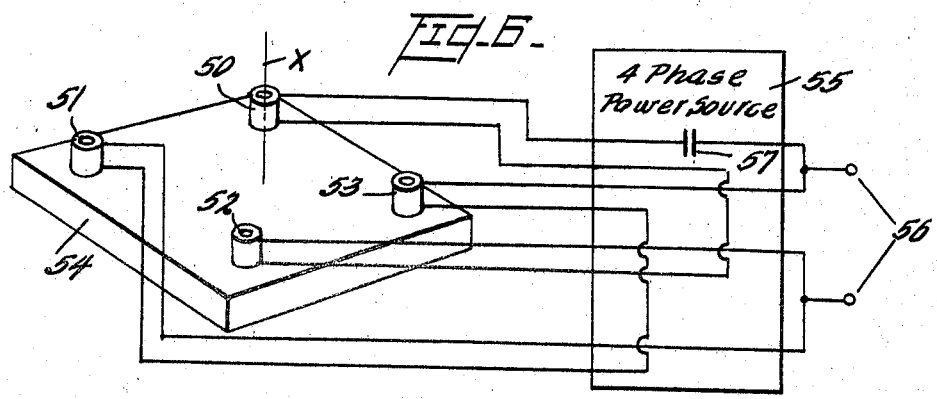

3,435,335
METHOD OF AND AN APPARATUS FOR DETERMINING A SPECIFIC POINT OR LINE
Frank H. Blitchington, Jr., Greensboro, N.C., assignor to Western Electric Company, Incorporated, New York, N.Y., a corporation of New York
Filed Jan. 12, 1966, Ser. No. 520,211
Int. Cl. G01r 33/02
U.S. Cl. 324—34
10 Claims

ABSTRACT OF THE DISCLOSURE

The invention concerns a system for determining a line or point in three-dimensional space. A polyphase power source is used to apply out-of-phase electrical signals to a plurality of magnetic coils. The coils may be arranged in a configuration which produces a magnetic field having zero magnitude along a predetermined line or point in the field. A sensing device, movable in and responsive to the magnetic field, may be used to determine the line or point of zero magnitude.

---

This invention relates to a method of and an apparatus for determining a specific point or line and more particularly to a method of and an apparatus for determining such a point or line utilizing three-dimensional dynamic magnetic fields.

In construction or manufacturing operations, it is sometimes desirable to determine accurately a specific point or line with respect to a workpiece. For example, in a construction operation it may be desirable to locate a point on one side of a wall with respect to a point on the opposite side of the wall by determining a line through the wall. Or in the manufacturing operations, it may be desirable to accurately position a tool with respect to a workpiece by determining a specific point or line relative to the workpiece.

Accordingly, an object of this invention is a method of and an apparatus for accurately determining a line in three-dimensional space.

Another object of the invention resides in a method of and an apparatus for accurately determining a point in three-dimensional space.

In accordance with these and other objects, the present invention contemplates a method of and an apparatus for determining a specific point or line wherein a plurality of coils are arranged in a particular spaced relationship with each other. A polyphase power source is connected to the coils for producing a three-dimensional dynamic magnetic field having zero magnitude at the point or along the line. Additional facilities sense the dynamic magnetic field to determine the point or line.

Other objects and advantages of the present invention will be apparent from the following detailed description when considered in conjunction with the accompanying drawings, wherein:

FIG. 1 is a side view of a preferred arrangement of apparatus for determining a line by utilizing a three-dimensional dynamic magnetic field;

FIG. 2 is a plane view of the field generating apparatus shown in FIG. 1;

FIG. 3 shows three curves representative of the magnetic field produced by the three respective coils of the generator of FIGS. 1 and 2;

FIG. 4 is an electrical schematic showing a "Y" connection for the three coils in the generator of FIGS. 1 and 2;

FIG. 5 is an electrical schematic showing a "Delta" connection for the three coils in the generator of FIGS. 1 and 2;

FIG. 6 is a perspective view of a three-dimensional dynamic magnetic field generator which utilizes four coils spaced at respective vertices of a square configuration for determining a line;

FIG. 7 shows four curves representative of the magnetic fields produced by the four respective coils of the generator of FIG. 6;

FIG. 8 is a plane view of another three-dimensional dynamic magnetic field generator in which four coils are spaced at respective vertices of a rhombic configuration for determining a line;

FIG. 9 is a perspective view of a preferred arrangement of apparatus for determining a point; and FIG. 10 is a perspective view of another three-dimensional dynamic magnetic field generator which utilizes five coils for determining a point.

PREFERRED ARRANGEMENT OF APPARATUS FOR DETERMINING A LINE

Referring first to FIGS. 1 and 2, an apparatus for generating a three-dimensional dynamic magnetic field to determine a line is shown. Three identical coils 20, 21, and 22 having parallel axes are mounted upon a base 23 of nonmagnetic material, such as wood. Each of the coils 20, 21, and 22 have a winding of insulated wire wound around a solid cylinder of ferromagnetic metal. The three coils preferably are equidistantly spaced from each other such that each coil is located at a vertex of an imaginary equilateral triangle.

The windings of the coils 20, 21, and 22 are connected to a three-phase power source 27 in either a "Y" configuration as shown in FIG. 4, or a "Delta" configuration as shown in FIG. 5. The windings are symmetrically connected to the source 27 such that magnetic flux in the same direction is produced within corresponding windings during positive cycles of current from corresponding phases of the source.

In FIG. 3, the dynamic magnetic flux produced by each of the coils 20, 21, and 22 along an imaginary line "X" parallel to the axes of the coils 20, 21, and 22 and equidistant from the coils 20, 21, and 22 is shown by three respective sine curves 29, 30, and 31. At any given instant of time the sum of the magnetic fluxes along this line "X" is zero. At all points spaced from the line "X," the dynamic magnetic field has a value greater than zero.

A sensing or a pickup coil 35 is shown in FIG. 1 for sensing the dynamic magnetic field. The winding of the sensing coil 35 is connected to an amplifier 36 which in turn is connected to an indicator 37, such as an ammeter. By moving the sensing coil 35 in a plane penpendicular to the axes of the coils 20, 21, and 22, it is possible to locate the line "X" along which the dynamic magnetic field is zero. If the coil 35 forms a cylinder having a length substantially greater than its diameter, the coil 35 may be tilted to align the axis of the coil parallel to the line "X"; or if a long ferromagnetic rod extends through the coil 35, the rod may be tilted to align the rod parallel to the line "X."

As shown in FIG. 1, the dynamic magnetic field generator may be positioned on one side of a nonmagnetic and nonconductive wall 40. Now, by moving the sensing coil 35 on the opposite side of the wall 40, it is possible to locate a position for the coil where the indicator is at a minimum. Then, a tool, such as a drill 41 having a bit 42 with ferromagnetic properties extending through the coil 35, may be tilted to a position where the indicator shows a smaller minimum. Thus, a tool extending through the axis of the sensing coil 35 may be accurately positioned and aligned parallel with respect to the axes of the three coils 20, 21, and 22 on the opposite side of the wall 40.

SECOND EMBODIMENT OF A GENERATOR FOR DETERMINING A LINE

Referring now to FIG. 6, four identical coils 50, 51, 52, and 53 having parallel axes are mounted upon a nonmagnetic base 54. Each of the coils 50, 51, 52, and 53 are positioned at one vertix of an imaginary rectangle or square. One phase of a four-phase power source 55 is connected to each of the windings of the coils 50, 51, 52, and 53 such that magnetic flux in the same direction is produced within corresponding windings during positive cycles of current in each phase.

The four-phase power source 55 is derived from a single-phase power source 56. The coils 51 and 53 are connected in series with the single-phase source 56 such that unidirectional current through the windings produces a magnetic flux in an upward direction in one coil and magnetic flux in a downward direction in the other coil. Similarly, the coils 50 and 52 are connected in series with the single-phase source 56 such that unidirectional current through the windings produces a flux in one coil opposite in direction to flux in the other coil. Additionally, a capacitor 57 is connected in series with the windings of coils 50 and 52. The sum of the inductive reactances of the serially connected coils 50 and 52 is equal to the sum of their resistances and the capacitor 57 has a capacitive reactance equal to twice the sum of the inductive reactances of the coils 50 and 52 so that the current through the coils 50 and 52 is 90° out of phase with the current through the coils 51 and 53. Thus, the four-phase power source 55 connected to respective windings of the coils 50, 51, 52, and 53 converts single-phase power into four-phase power.

The magnetic flux produced by each of the coils 50, 51, 52, and 53 along an imaginary line "X" which is parallel to and equidistant from the axis of each of the coils as shown in FIG. 7 by four respective curves 58, 59, 60, and 61. Along the line "X" the sum of the magnetic flux produced by each of the coils is always zero. At all points spaced from the line "X," the dynamic magnetic field has a value greater than zero. Thus, the dynamic magnetic field generator shown in FIG. 6 may be used in the same manner as the dynamic magnetic field generator previously described and shown in FIGS. 1 and 2.

THIRD EMBODIMENT OF A DYNAMIC MAGNETIC FIELD GENERATOR FOR DETERMINING A LINE

FIG. 8 shows four identical coils 70, 71, 72, and 73 having parallel axes mounted on a nonmagnetic base 74 in a rhombic or parallelogram arrangement. One phase of a two-phase source 75 is connected to coils 70 and 73 and the other phase is connected to coils 71 and 72.

The two-phase source 75 is derived from a single-phase source 76. The windings of the coils 70 and 72 are serially connected with the single-phase power source 76 such that a unidirectional current within the windings produces a magnetic flux in an upward direction in one coil and a magnetic flux in a downward direction in the other coil. Similarly, the windings 71 and 73 are serially connected with the single-phase power source 76 such that the instantaneous magnetic flux produced in one coil is opposite in direction to the instantaneous magnetic flux in the other coil.

Along a line "X" which runs through the intersection of imaginary diagonals of the rhombic arrangement and parallel to the axes of the coils 70–73, the sum of the magnetic fields produced by each of the coils 70–73 will be zero. Thus, the described dynamic magnetic field generator shown in FIG. 8 may be used in a manner similar to that of the generator previously described and shown in FIGS. 1 and 2.

PREFERRED ARRANGEMENT OF APPARATUS FOR DETERMINING A POINT

Referring to FIG. 9, six identical coils 80, 81, 82, 83, 84, and 85 having parallel axes are mounted upon the sides 87 and 88 of a nonmagnetic U-shaped support. Three of the coils 80, 81, and 82 are mounted on one of the sides 87 in an equilateral triangular arrangement similar to that of the apparatus for generating a line as shown in FIGS. 1 and 2. The other three coils 83, 84, and 85 are mounted upon the other side 88 in a similar equilateral triangular arrangement which is inverted from that of the arrangement of the coils 80, 81, and 82. The spacing between the sides 87 and 88 is such that each of the coils 80–85 is positioned at a vertex of an imaginary equilateral octahedron.

A three-phase power source 89 is connected to the coils 80, 81, and 82 on the wall 87 in the same manner that the three-phase power source 27 is connected to the three coils 20, 21, and 22 in the magnetic field generator of FIGS. 1 and 2. The three coils 83, 84, and 85 on the wall 88 are also connected to the three-phase power source 89 such that coils located on exactly opposite vertices of the imaginary octahedron produce magnetic flux in opposite directions. Current through the windings of coils 80 and 83 produce magnetic fluxes in opposite directions at an imaginary point "Y" equidistant between the coils 80 and 83 which cancel each other out. Similarly, the fluxes produced by the coils 81 and 84 cancel each other at the imaginary point "Y," and the fluxes produced by the coils 82 and 85 cancel each other at point "Y." Thus, at the imaginary point "Y" within the center of the imaginary octahedron, the sum of the magnetic fluxes produced by each of the coils 80–85 is zero.

A sensing coil 90 connected to an amplifier 91 and an indicator 92 is used to sense the imaginary point "Y" of zero dynamic magnetic field. The sensing coil 90 may be mounted upon a nonmagnetic arm 94 extending from the cutting tool 95 of a lathe. Thus, it is possible to accurately position the cutting tool 95 accurately with respect to a workpiece in three dimensions.

ALTERNATE EMBODIMENT OF A GENERATOR FOR DETERMINING A POINT

Referring to FIG. 10, five coils 100, 101, 102, 103, and 104 having parallel axes are mounted upon walls 106 and 107 of a nonmagnetic U-shaped support. Three identical coils 100, 101, and 102 are mounted upon the wall 106 in a triangular configuration, the same as the three coils 20, 21, and 22 are mounted upon the base 23 of the apparatus shown in FIGS. 1 and 2. A three-phase power source 108 is connected to the coils 100, 101, and 102 in a manner similar to the previously described connection of the three-phase power source 27 to the coils 20, 21, and 22 of FIGS. 1 and 2.

The coil 103 is mounted at a point equidistant between the coils 100, 101, and 102 on the wall 106. The coil 104 is mounted upon the opposite wall 107 parallel and in alignment with the coil 103. Opposite phases of a two-phase power source are connected to each of the windings 103 and 104 or, as shown in FIG. 10, a single-phase power source 109 may be connected to the windings of coils 103 and 104 such that a current through the coils 103 and 104 within the coil 103 produces a magnetic flux which is opposite in direction to magnetic flux produced in the coil 104.

Thus, at an imaginary point "Y" equidistant between the coils 103 and 104 the sum of the magnetic fluxes produced by the five coils 100–104 is always zero. At all other points, the dynamic magnetic field has a magnitude greater than zero. This dynamic magnetic field generator shown in FIG. 10 may be used in the same manner as the generator shown in FIG. 9.

What is claimed is:
1. An apparatus for determining a line, comprising:
three coils having parallel axes which are spaced equidistantly from each other;
polyphase power means including a source of three phase current with one phase connected to each coil for producing a three-dimensional dynamic magnetic field having zero magnitude only along the line; and means for sensing the dynamic magnetic field to determine the line.

2. An apparatus for determining a line as defined in claim 1, in which:

the sensing means includes a pickup coil having a length greater than its diameter to determine both the position and direction of the line.

3. A method of determining a line, comprising:

applying a polyphase current to a plurality of coils to produce a three-dimensional dynamic magnetic field having zero magnitude only along the line; and moving a pickup coil relative to the line to sense a minimum of induced current in the coil to determine the position of the line.

4. A method of determining a line, as defined in claim 3, which includes the additional step of:

tilting the pickup coil to sense a minimum of induced current in the coil to determine the direction of the line.

5. An apparatus for determining a point in a three-dimensional space, comprising:

at least five coils spaced from each other in a three-dimensional array;

polyphase power means connected to said coils for producing a three-dimensional dynamic magnetic field having zero magnitude only at the point; and means for sensing the dynamic magnetic field to determine the point.

6. An apparatus for determining a point in a three-dimensional space, as defined in claim 5, wherein:

there are six coils spaced from each other such that each coil is positioned at vertices of an equilateral octahedron;

the polyphase power means includes a source of three-phase current connected to the coils, such that the three coils positioned at the vertices of each of the triangular sides have different phases of current for producing a three-dimensional dynamic magnetic field having zero magnitude at the point; and the sensing means includes a pickup coil for sensing the magnetic field to determine the point.

7. A method of determining a point in a three-dimensional space, comprising:

applying a polyphase current to a plurality of coils to produce a three-dimensional dynamic magnetic field having zero magnitude only at a point; and moving a coil relative to the point to sense the absence of induced current in the coil to determine the position of the point.

8. An apparatus for determining a line in three-dimensional space, which comprises:

at least three magnetic coils equidistantly spaced about a line and having axes parallel to said line;

a polyphase power source connected to said magnetic coils for producing a three-dimensional magnetic field having a zero magnitude along said line; and sensing means responsive to the magnetic field for determining said line in the magnetic field having zero magnitude.

9. An apparatus for determining a line in three-dimensional space, which comprises:

a polyphase power source for generating out-of-phase electrical signals;

a plurality of magnetic coils connected to said polyphase power source and arranged in a configuration to produce a three-dimensional magnetic field having zero magnitude along a predetermined line in the magnetic field; and sensing means movable in and responsive to the magnetic field for determining said predetermined line in the magnetic field having zero magnitude.

10. An apparatus for determining a point in three-dimensional space, which comprises:

a polyphase power source for generating out-of-phase electrical signals;

a plurality of magnetic coils to which said out-of-phase electrical signals are applied, said magnetic coils arranged in a configuration to produce a three-dimensional magnetic field having zero magnitude at a predetermined point in the magnetic field; and sensing means movable in and responsive to the magnetic field for determining the predetermined point in the magnetic field having zero magnitude.

References Cited

UNITED STATES PATENTS

| 2,036,736 | 4/1936 | Wright | 335—177 X |
| 2,598,285 | 5/1952 | Muffly | 324—43 X |
| 3,156,862 | 11/1964 | Herrick | 324—37 |
| 3,320,503 | 5/1967 | Schooley et al. | 318—25 |

RUDOLPH V. ROLINEC, *Primary Examiner.*

A. E. SMITH, *Assistant Examiner.*

U.S. Cl. X.R.

318—18; 340—195